United States Patent [19]

Chavallo, Jr.

[11] Patent Number: 5,465,682

[45] Date of Patent: Nov. 14, 1995

[54] MODULAR EXERCISE, PLAY, AND LIVING STRUCTURE FOR DOMESTIC CATS

[76] Inventor: Eusevio Chavallo, Jr., 1327 N. 24th, Apt. 7A, Pasco, Wash. 99301

[21] Appl. No.: 122,780

[22] Filed: Sep. 15, 1993

[51] Int. Cl.[6] .................................................. A01K 15/02
[52] U.S. Cl. ................................................................ 119/19
[58] Field of Search ............................ 119/19, 28.5, 706

[56] References Cited

U.S. PATENT DOCUMENTS

| | | | |
|---|---|---|---|
| D. 261,186 | 10/1981 | Michalski | D30/42 |
| D. 268,213 | 3/1983 | Lovitt | D30/1 |
| 3,479,990 | 11/1969 | Crow | 119/1 |
| 3,552,356 | 1/1971 | Rosenthal | 119/29 |
| 3,581,707 | 6/1971 | Look | 119/19 |
| 3,595,209 | 7/1971 | Parker | 119/29 |
| 3,618,568 | 11/1971 | Breeden | 119/15 |
| 4,171,683 | 10/1979 | Godin | 119/15 |
| 4,177,761 | 12/1979 | Bellocchi, Jr. | 119/19 |
| 4,267,799 | 5/1981 | Bacon | 119/29 |
| 4,301,766 | 11/1981 | Piccone | 119/1 |
| 4,347,807 | 9/1982 | Reich | 119/19 |
| 4,367,695 | 1/1983 | Lance | 119/19 |
| 4,497,279 | 2/1985 | Bell | 119/29 |
| 4,576,116 | 3/1986 | Binkert | 119/19 |
| 4,677,938 | 7/1987 | Tominaga | 119/29 |
| 4,722,299 | 2/1988 | Mohr | 119/29 |
| 4,803,952 | 2/1989 | Houser | 119/19 |
| 4,947,795 | 8/1990 | Farkas | 119/29 |
| 5,002,012 | 3/1991 | Pierrot | 119/706 X |
| 5,038,716 | 8/1991 | Olson | 119/706 |

FOREIGN PATENT DOCUMENTS

| | | | |
|---|---|---|---|
| 3903473 | 8/1989 | Germany | 119/706 |
| 8101728 | 12/1981 | Netherlands | 119/706 |

Primary Examiner—Gene Mancene
Assistant Examiner—Thomas Price
Attorney, Agent, or Firm—Wells, St. John, Roberts, Gregory & Matkin

[57] ABSTRACT

A modular exercise, play, and living apparatus for cats includes a support frame having a base, a plurality of elevated platforms, and a plurality of upstanding frame members which extend between the base and an upper-level elevated platform. The support frame includes a plurality of slidably interlocking dovetail joints connecting the various support frame components to allow interlocking assembly and subsequent disassembly of the support frame. This allows the support frame to be disassembled and arranged in a knocked-down shipping arrangement. A plurality of compartments are supported by the support frame, including a living compartment, an eating compartment, and a litter compartment. A number of optional cat toys are mounted on or around the intermediate-level shelf.

30 Claims, 8 Drawing Sheets

MODULAR EXERCISE, PLAY, AND LIVING STRUCTURE FOR DOMESTIC CATS

TECHNICAL FIELD

This invention relates to exercise, play, and living structures for domestic cats.

BACKGROUND OF THE INVENTION

Cat ownership provides a number of benefits, some of which are intangible. One of the most obvious benefits is companionship. However, cats also provide entertainment and amusement for their owners through their normal and sometimes playful activities.

Despite the enjoyable characteristics of cats, many are shy and retiring, preferring to stay out of the way of human activities-particularly human activities which involve children, strangers, or dogs. This causes many cats to adopt hidden corners or other out-of-the-way spots as their own private areas. While these spots may be acceptable to the cat, the cat owner might not approve of the chosen spots. Furthermore, most cat owners would prefer that their cat spend more time in observable places, so as to increase the enjoyment of cat ownership. In an effort to lure their cat into view, cat owners purchase a variety of toys and other apparatuses which are placed in the owners' living areas so that the cat can entertain and amuse the owners while playing. Even so, most cats will not remain in these areas for long.

Cat "houses" are available for use within an owner's home. However, these houses typically defeat one of the primary benefits of cat ownership by allowing the cat to hide itself from view. Other devices include various play equipment, scratching posts, and climbing elements. Many of these structures are desirably quite large, presenting a shipping problem for distributors and a storage problem for retail sellers of such structures.

The invention described below is a structure which can be located in or near an owner's primary living areas, while also providing privacy and security for a cat. The structure also includes a number of optional play devices. The result is a dwelling structure which a cat can consider his own, within the midst of his owner's otherwise distracting activities. Having such an area encourages the cat to be visible more often, since he has the confidence of knowing that a safe and quick retreat is possible. The structure is light-weight and easily assembled to require a minimum amount of space, while also being easily disassembled for efficient shipping and storage.

DETAILED DESCRIPTION OF THE PREFERRED EMBODIMENT

This disclosure of the invention is submitted in furtherance of the constitutional purposes of the U.S. Patent Laws "to promote the progress of science and useful arts." U.S. Constitution, Article 1, Section 8.

FIGS. 1–4 show a preferred embodiment of a modular exercise, play, and living apparatus or structure for cats, generally designated by the reference numeral 10. Modular structure 10 is shown in its assembled state, although it can be easily disassembled as described below. It is generally fabricated from light-weight plastics such are commonly available.

Modular structure 10 comprises an interlocking support frame 12. Support frame 12 generally comprises at least one upstanding frame member and at least one compartment supported by the support frame. More specifically, support frame 12 has a base 14 and a plurality of upstanding frame members 20 which extend upwardly from base 14. Support frame 12 preferably includes at least one elevated platform, and more preferably a plurality of elevated platforms. As shown, there are vertical frame members 20, an upper-level elevated platform 16, and an intermediate-level platform or shelf 24. The base and the two elevated platforms are rectangularly shaped. Base 14 and upper-level elevated platform 16 have identical or nearly identical lateral dimensions. Shelf 24 is somewhat narrower than base 14.

The elevated platforms are supported above base 14 by upstanding frame members 20. One of frame members 20 extends between base 14 and upper-level elevated platform 16 at one end of base 14. The other two of frame members 20 extend between base 14 and upper-level elevated platform 16 at the other end of base 14.

The support frame includes at least one and preferably a plurality of slidably interlocking connections or joints 26. More specifically, each of upstanding frame members 20 is connected to base 14 and to upper-level platform 16 by a slidably interlocking joint 26 to allow interlocking assembly and subsequent disassembly of the support frame. This allows support frame 12 to be disassembled and arranged in a knocked-down shipping arrangement.

Figure 13:
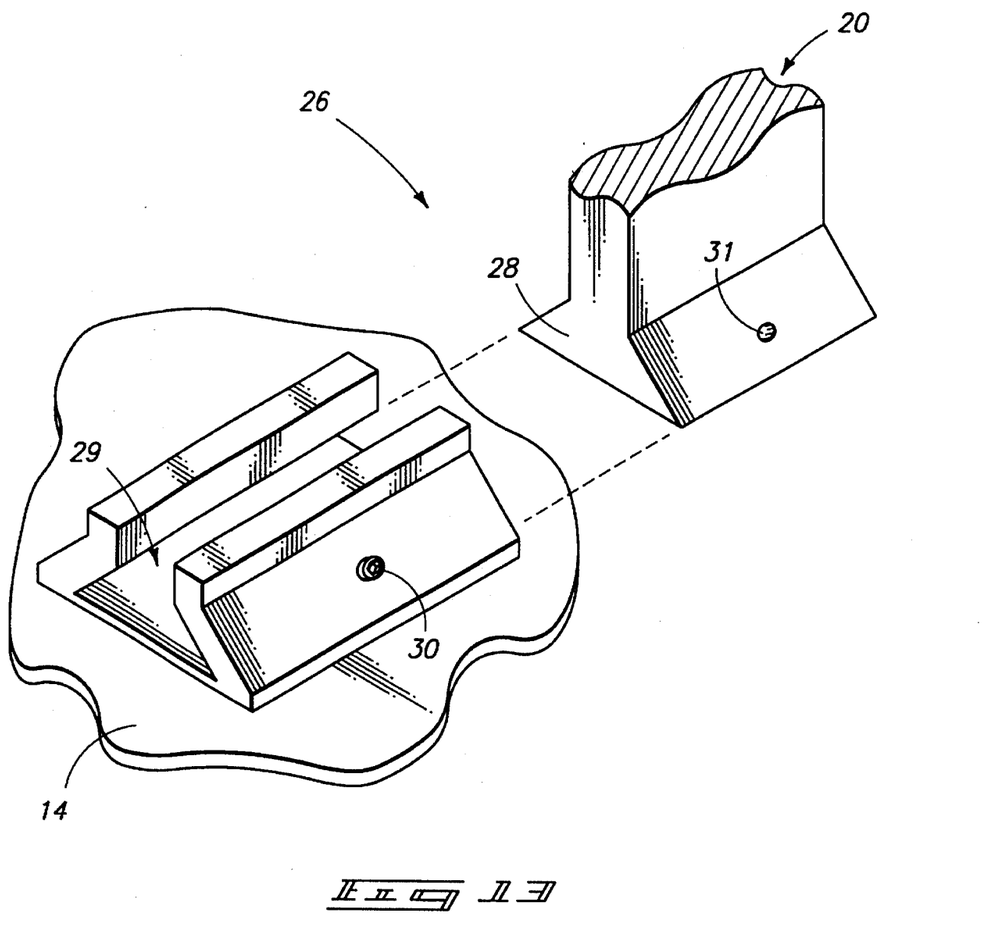
FIG. 13 is an enlarged view of an interlocking frame connection in accordance with a preferred embodiment of the invention.

One of joints 26 is shown in FIG. 13. In the preferred embodiment shown, interlocking connection 26 comprises a dovetail joint including a receptacle and an inserted part or portion. More specifically, the dovetail joint is formed by a flaring or triangular tenon 28 on the end of one of frame members 20. A corresponding mortise 29 is formed on base 14 to receive tenon 28. Mortise 29 is formed by an opposed pair of mortise pieces on top of base 14. Alternatively, mortise 29 could be formed in the base itself. Tenon 28 fits tightly within mortise 29, making an interlocking joint between the frame member and the base which resists pulling apart in all directions except one. A similar dovetail joint is formed at each end of each frame member 20, to connect both base 14 and upper-level platform 16 to the frame members. A removable and threaded set screw 30 extends through mortise 29 and into a receiving depression or hole 31 in tenon 28 to secure the tenon within the mortise. The interlocking connections facilitate simple assembly and disassembly.

Figure 1:
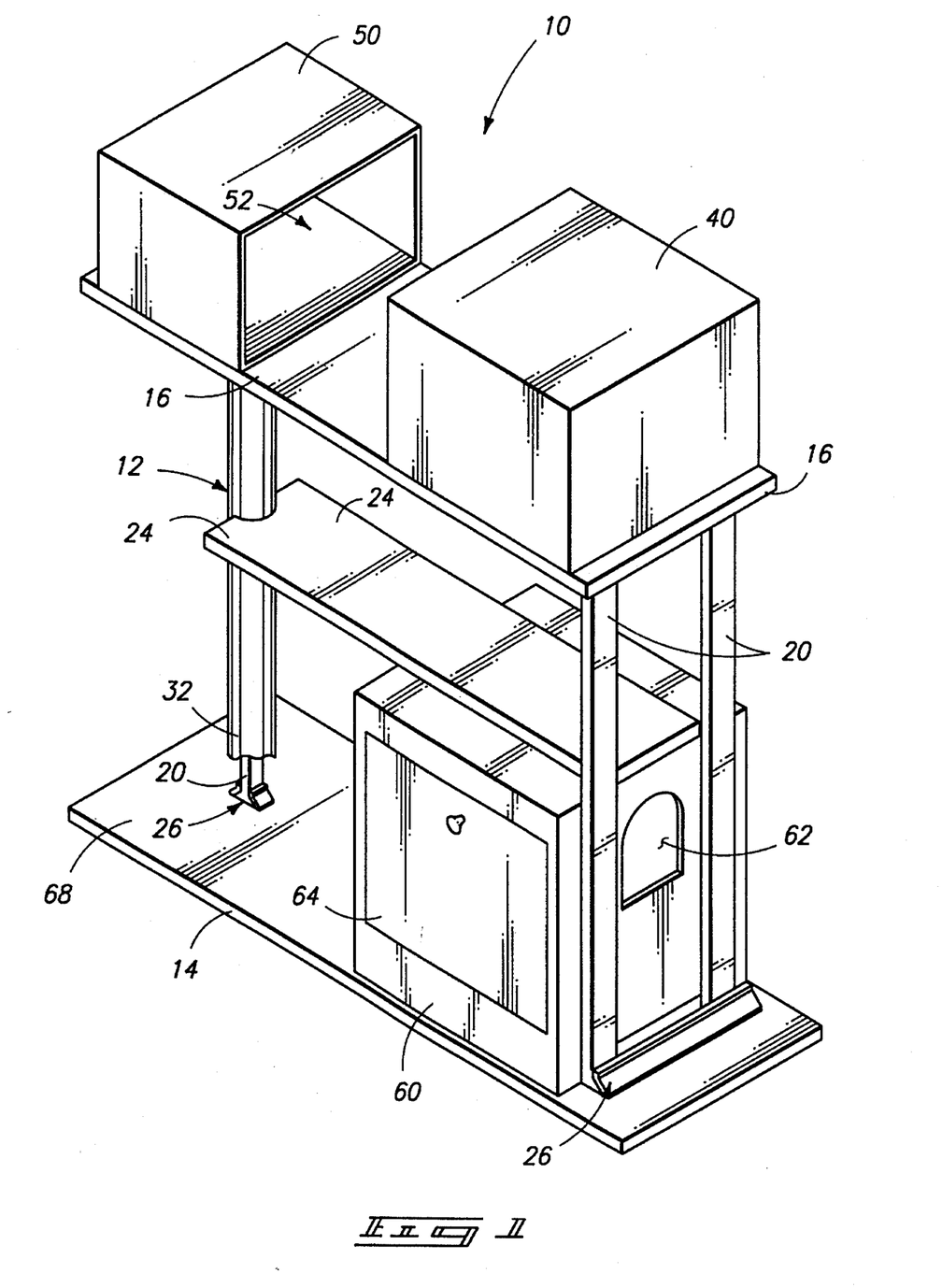
FIG. 1 is a perspective view of a preferred embodiment of a modular exercise, play, and living structure for cats built according to this invention.
Figure 2:
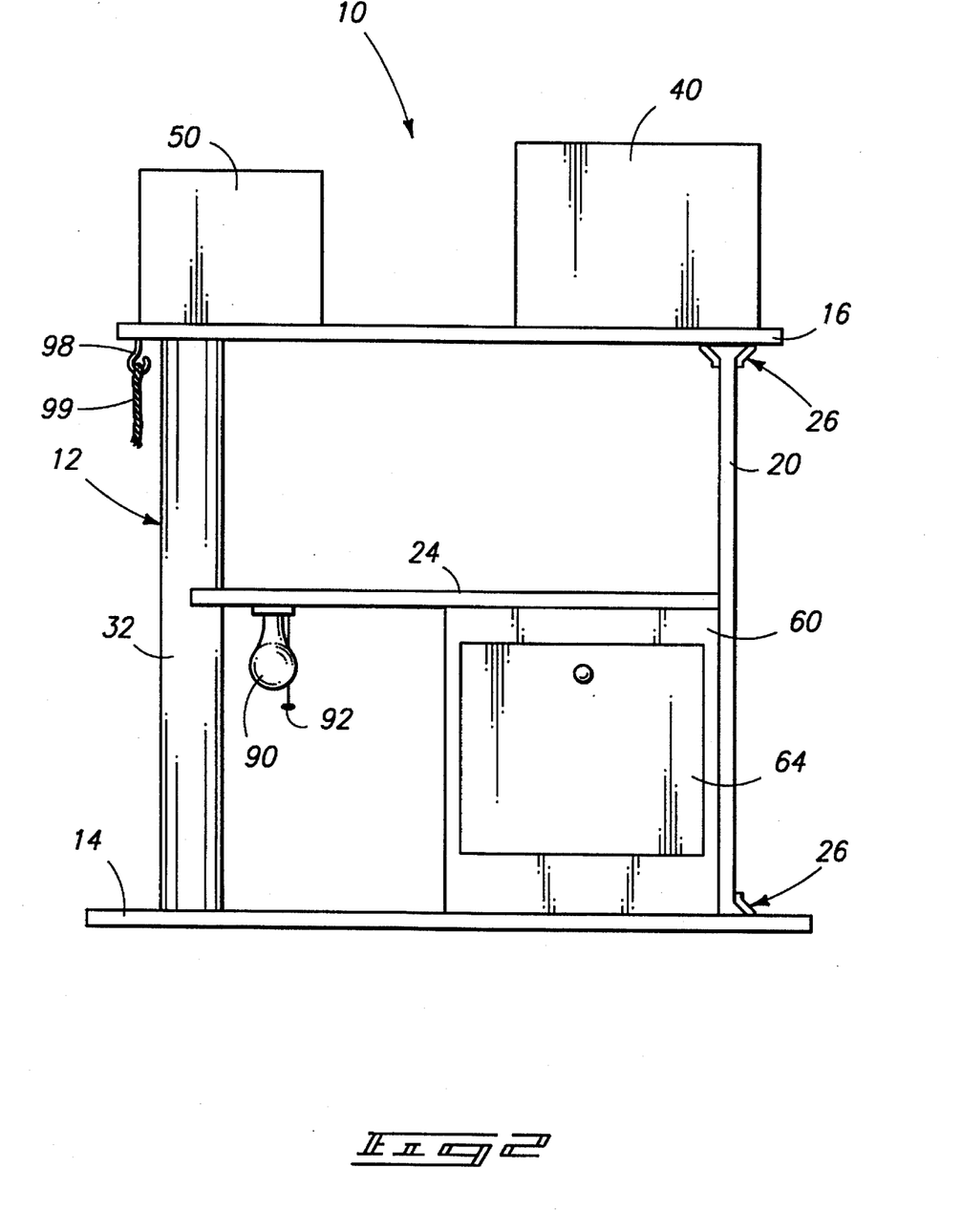
FIG. 2 is a front view of the structure shown in FIG. 1.
Figure 3:
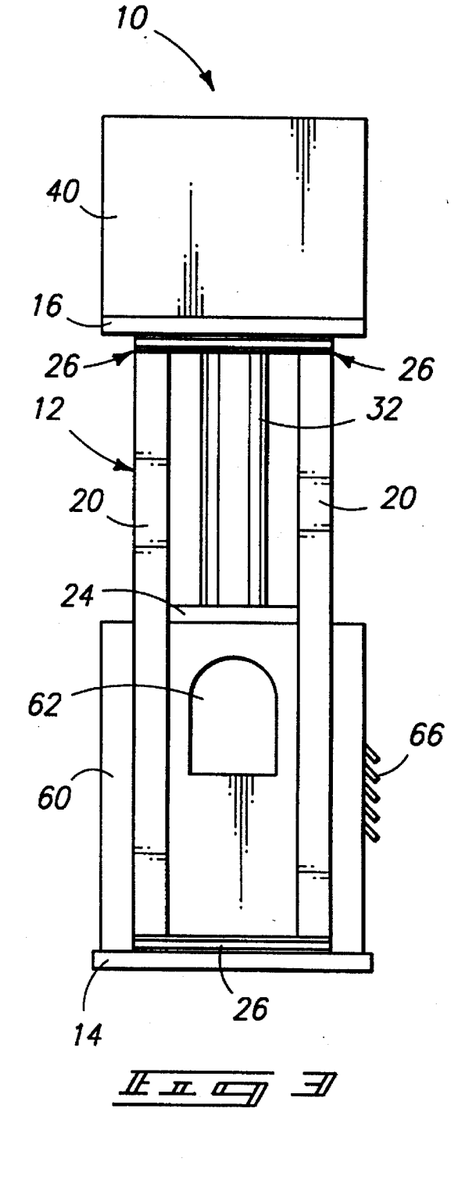
FIGS. 3 and 4 are side views of the structure shown in FIG. 1.
Figure 4:
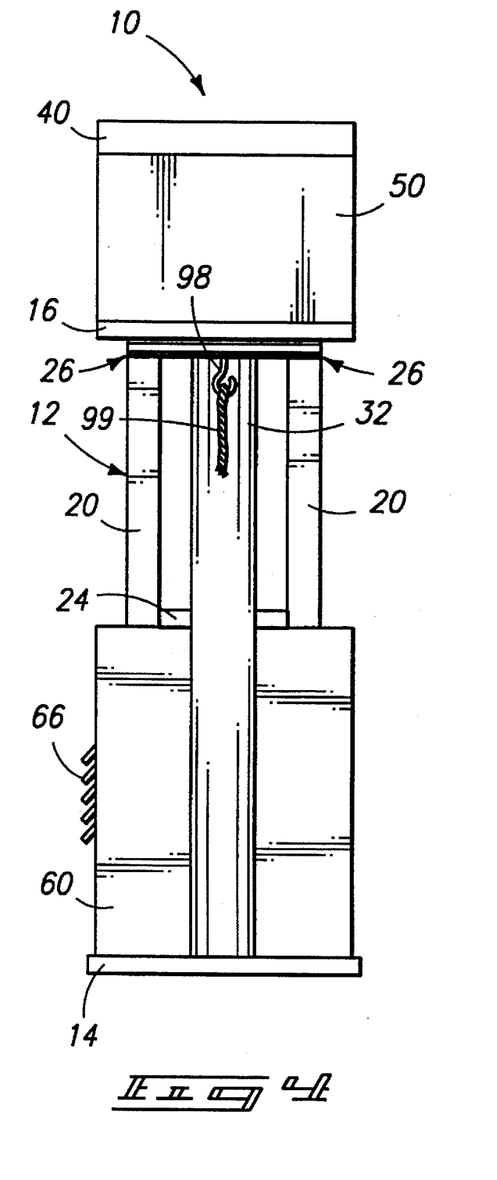

Intermediate-level shelf 24 is supported between the upstanding frame members 20 at an intermediate elevation between base 14 and upper-level elevated platform 16. The primary function of intermediate-level shelf 24 is to provide a platform on or around which cat play equipment is mounted. It also provides a platform on which a cat may sit, stand, lay, walk, or play. The cat can play using such play equipment.

Support frame 12 also includes a hollow tube 32 received over one of upstanding frame members 20. Tube 32 is advantageously cylindrical and extends between base 14 and upper-level elevated platform 16. Tube 32 is preferably formed of plastic or cardboard, having an outer surface which is at least partially covered with a fibrous material, such as a durable fabric or carpet. This construction forms a clawing or scratching post for a cat, securely mounted upon and integrated with support frame 12.

Modular structure 10 further includes a plurality of living modules or compartments which are supported by support frame 12. One, and more preferably two, of said living compartments are attached to support frame 12 on top of upper-level elevated platform 16. Another compartment is attached to support frame 12 on top of base 14. The living compartments are generally in the form of rectangular boxes which are easily mountable to and detachable from support frame 12. Each of the living compartments has an entrance opening and aperture to allow a cat to enter and exit the compartments.

Figure 6:
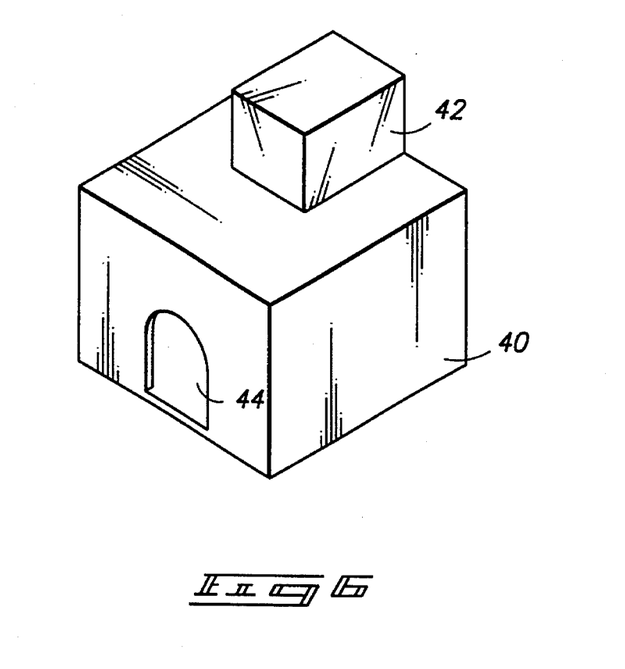
FIG. 6 is a perspective view of a living module, in isolation, which forms part of the structure shown in FIG. 1.

More specifically, a first living compartment 40 functions as a primary living compartment for a cat—more or less as a "living room." First living compartment 40 is best shown in FIG. 6, along with an optional transparent observatory or skylight 42. First living compartment 40 has an entrance aperture 44 to allow a cat to enter and exit the living compartments such as from upper-level elevated platform 16. The outer surfaces of first living compartment are optionally provided with carpet or fabric (not shown). The interior of first living compartment 40 can contain a pad or pillow (not shown) as desired. Observatory 42 is fabricated from a transparent or semi-transparent rigid material such as plexiglass to allow a cat to see out from within first living compartment 40. First living compartment 40 is suitably attached to the top of upper-level elevated platform 16 by screws or other quick-fasteners (not shown) to allow first living compartment 40 to be easily and quickly assembled and disassembled relative to support frame 12. Furthermore, living compartment 40 is preferably formed of interlocking panels which are assembled without tools.

A second living compartment 50 functions as an eating room or feeding compartment for presenting and containing a cat's meal. Second living compartment 50 is attachable to the top of upper-level elevated platform 16 in a manner similar to first living compartment 40, being similarly constructed of interlocking panels. Second living compartment 50 has a large entrance aperture 52, essentially formed by one complete side of living compartment 50. This allows easy placement of food into the compartment, as well as entrance by the cat from upper-level elevated platform 16.

Placement of compartments 40 and 50 at the top of structure 12 provides increased security for a cat. The elevated location also protects the cat and its food from dogs and children. Once a cat becomes accustomed to the structure, the cat will prefer it to ground or other less secure locations which are more easily reached by dogs and humans. The elevation of the living compartments provides the cat with an excellent view of its surroundings, while also placing the cat in a location which can be viewed by the cat's owner. Owners will also appreciate not having to stoop down to place the cat's water and food.

Figure 5:
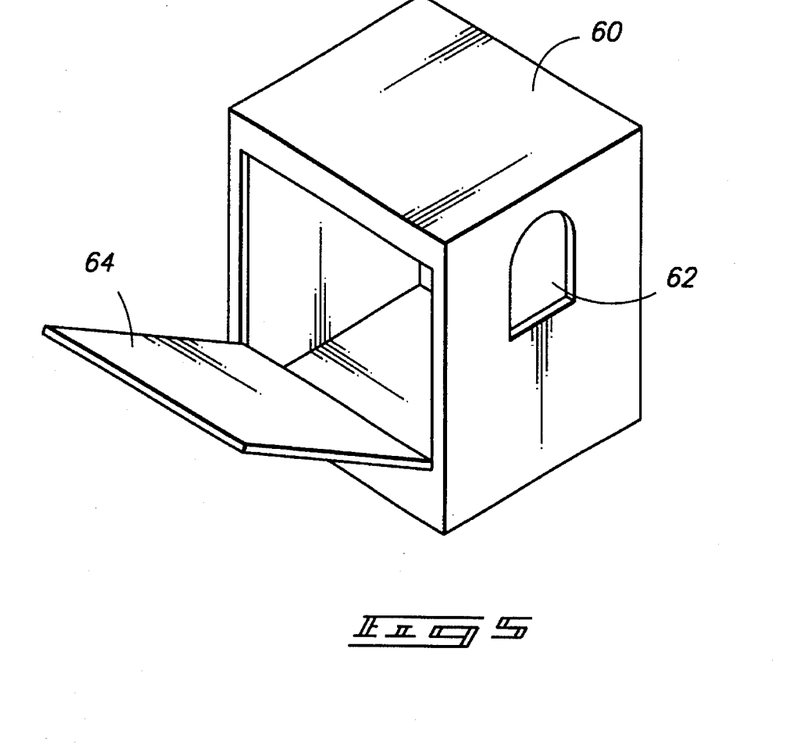
FIG. 5 is a perspective view of a litter module, in isolation, which forms part of the structure shown in FIG. 1.

A third living compartment 60 is also advantageously included. As shown, compartment 60 is attached to the top of base 14 in a manner similar to the attachment of first living compartment 40 to upper-level elevated platform 16. Compartment 60 is preferably constructed of interlocking panels. Third living compartment 60 is a litter compartment for containing cat litter. It has an entry aperture 62 for entry of a cat, as well as a hinged access door 64 for removing cat litter and any associated container from the litter compartment. FIG. 5 shows litter compartment 60 in more detail, with hinged door 64 in an open position. Litter compartment 60 is also provided with louvered vent openings 66 to allow air circulation to and from the interior of litter compartment 60.

The particular placement of litter compartment 60 near the floor provides privacy for the cat as well as an unobtrusive location for cat litter. Entry aperture 62 is large enough to allow entrance of the cat, while preventing entry of dogs or children. It is elevated above the floor to further discourage intrusion by dogs and children.

Figure 10:
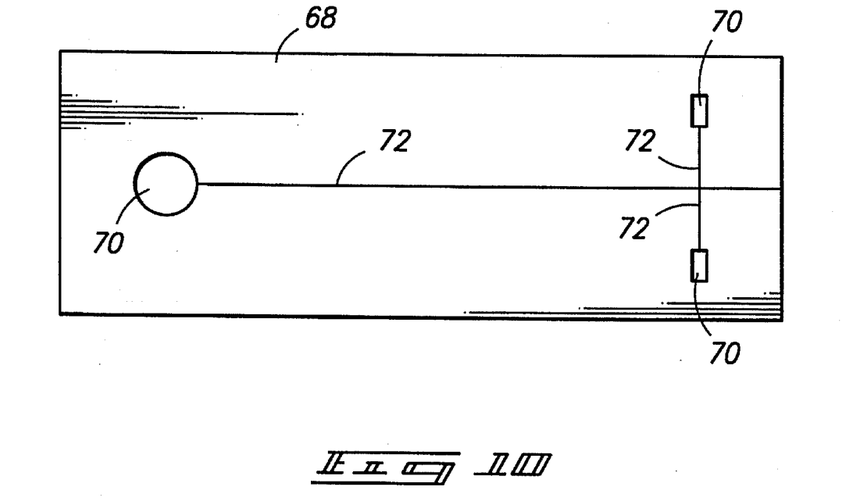
FIG. 10 is a top view of a carpet mat for use with the structure shown in FIG. 1.

Base 14 is carpeted, preferably with a detachable mat, such as an artificial turf mat 68 (FIG. 10). Apertures 70 are positioned in mat 68 for upstanding frame members 20. In addition, mat 68 includes slits 72 leading to apertures 70 so that the mat can be placed over base 14 around upstanding frame members 20 after assembly of support frame 12.

As mentioned above, one of the purposes of intermediate-level shelf 24 is to support various play equipment for cats. Such play equipment is also mounted on or around intermediate-level shelf 24, which serves as a platform for a cat as the cat plays with the play equipment. Described below are some of the optional play devices which might be attached on or around intermediate-level shelf 24.

Figure 7:
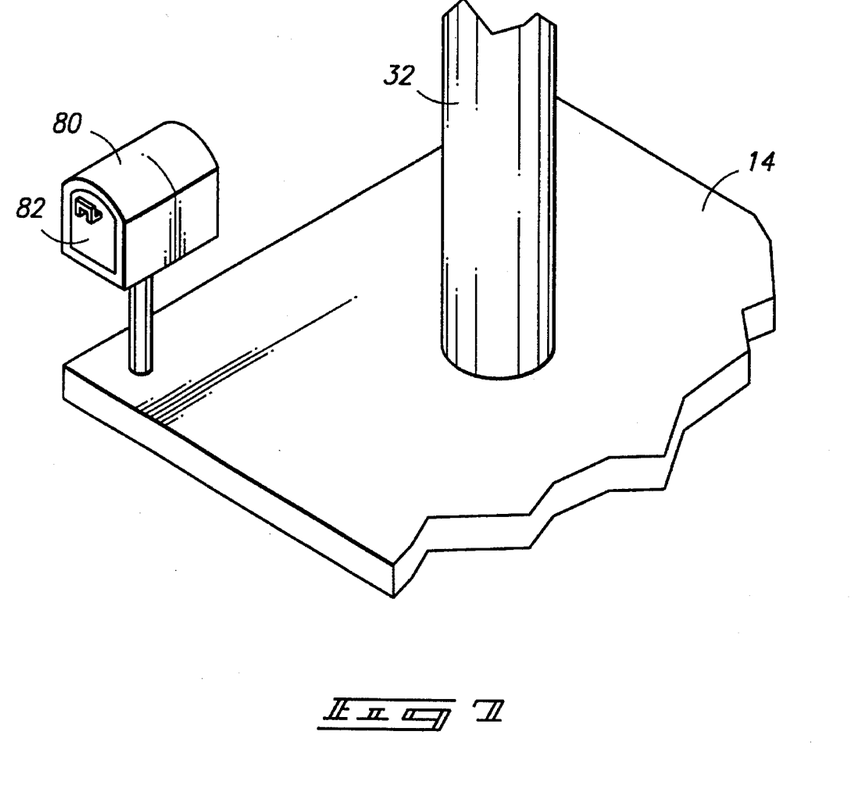
FIG. 7 is a perspective view showing an optional cat mailbox as used with the structure shown in FIG. 1.

FIG. 7 shows a toy mailbox 80 which is mounted to support frame 12 on base 14 beneath intermediate-level shelf 24. Mailbox 80 could be imprinted with a cat's name. It has an operable door 82 which cats enjoy playing with.

Figure 8:
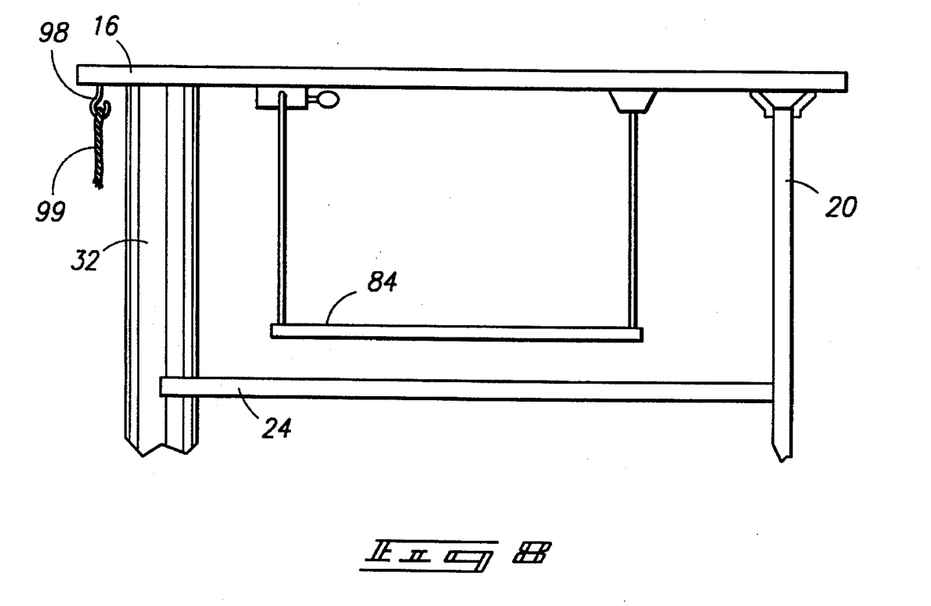
FIG. 8 is a perspective view showing an optional toy swing as used with the structure shown in FIG. 1.

FIG. 8 shows a toy swing 84 which extends downward from upper-level elevated platform 16 above intermediate-level shelf 24. Swing 84 can be freely mounted so that a cat can bat it around, or can include a windup device which automatically propels the swing. Either alternative provides an enjoyable toy for a cat.

FIG. 8 also shows a hook 98 which extends downward from upper-level elevated platform 16 at one of its ends. Hook 98 can be connected to suspend a variety of playthings or swinging toys. In the preferred embodiment shown, a rope 99 is hung from hook 98. Such a rope might be used by itself or in conjunction with an attached toy to provide entertainment for a cat.

Figure 9:
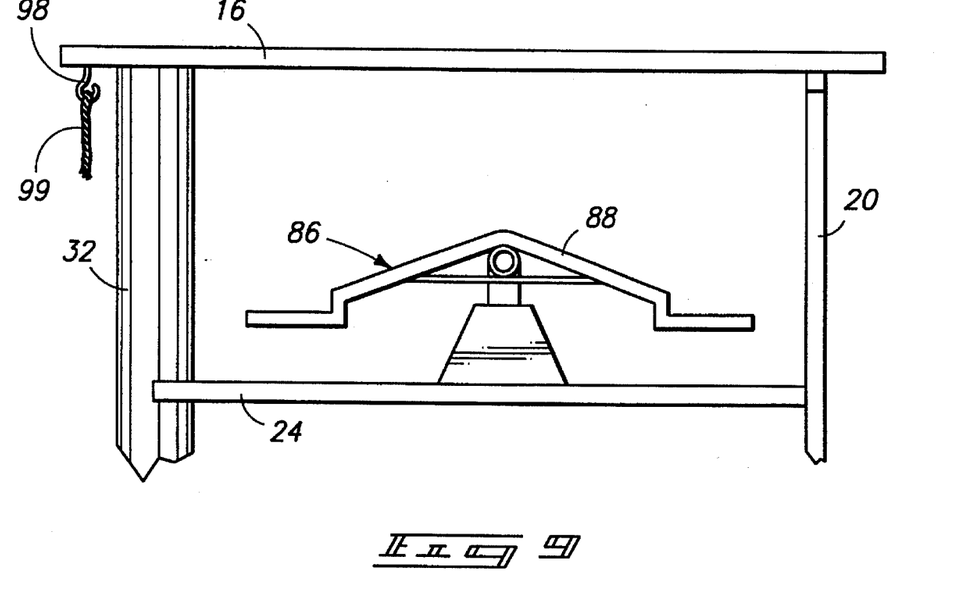
FIG. 9 is a perspective view showing an optional rocking toy as used with the structure shown in FIG. 1.

FIG. 9 shows a rocking toy 86, simulating a teeter-totter, supported upon intermediate-level shelf 24. Rocking toy 86 comprises a rocking member 88 which is pivotally mounted at its center to be rocked by a cat. The rocking toy is preferably spring-loaded so that it will bounce repeatedly after being batted by the cat.

A light or lamp 90 (FIG. 2) can also be optionally mounted to extend downward from intermediate-level shelf 24. The light can be actuated or turned on by a cat's owner, or alternatively be automatically controlled by a timer or light-sensing device. Even more preferably, light 90 is actuable by the cat itself, such as by a pull string 92 or by a touch-operated switch (not shown).

Figure 11:
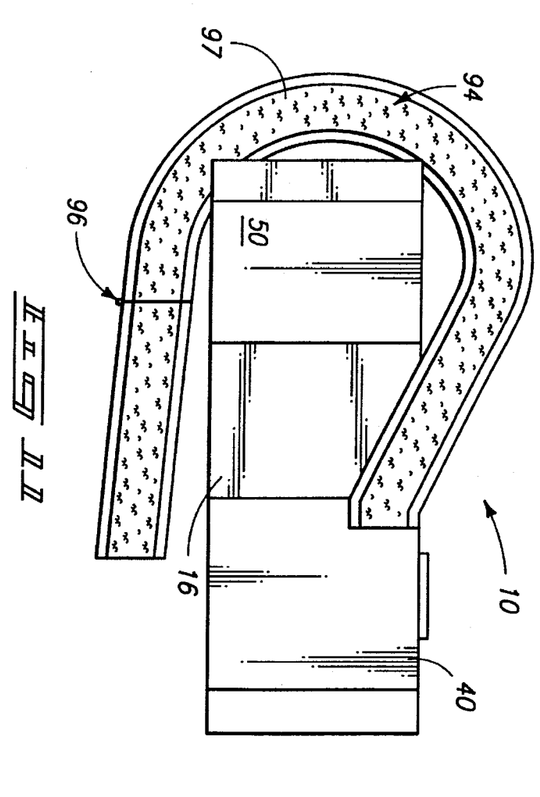
FIG. 11 is a top view the structure shown in FIG. 1, with the addition of a slide for use by a cat.
Figure 12:
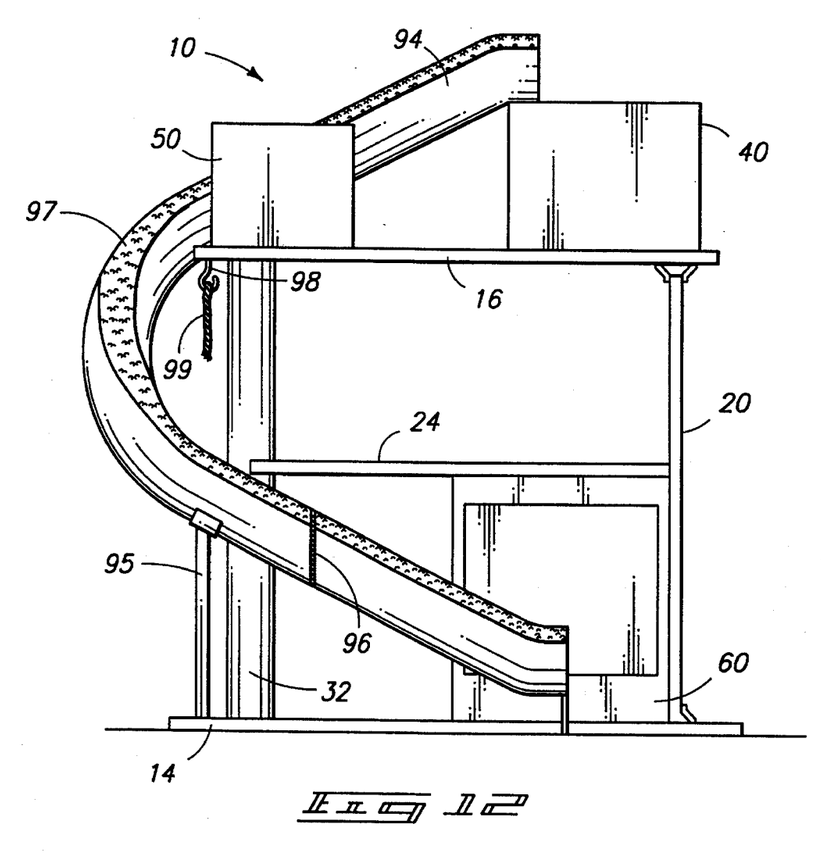
FIG. 12 is a front view of the structure and slide shown in FIG. 11.

FIGS. 11 and 12 shown a further optional accessory, a tubular slide 94 which extends from upper portions of apparatus 10, such as from first living compartment 40, to the floor in a spiral path. Slide 94 is preferably formed of transparent or semi-transparent plastic tubing so that the cat is visible as it slides. Slide 94 is segmented, comprising a plurality of pieces which are assembled to extend around modular structure 10 to the floor. Slide 94 is curved in a roughly helical shape, extending outwardly and downwardly in a semi-circular path around support frame 12 as it descends toward the floor. A vertical support strut 95 is positioned to extend from the floor to an intermediate position along the length of slide 94 to provide vertical support for slide 94. The slide further includes a hinged joint 96 at a point toward the bottom of the slide. This allows the lower portion of the slide to be pivoted outward, away from the living apparatus, thereby allowing access to hinged door 64. The slide further includes, as an optional feature, a strip of carpet 97 along its top surface. This allows a cat to climb back up the slide after its downward trip.

The components of modular structure 10 are advantageously fabricated from appropriately-shaped plastic or wood components. The components are light weight. Base 14 is intended to be heavier than the other components to help stabilize the structure and to reduce the risk of tipping.

The modular structure described above results in a comfortable environment for a cat, providing privacy, protection, entertainment, and visibility. It also adds to the convenience and enjoyment of a cat's owner, by placing the cat's main living quarters within easy view. The structure can be easily knocked-down, disassembled, and arranged in a configuration for shipment. It can also be readily assembled. The modularity of the components allows deletion of components shown, or replacement and addition of compartments as desired.

In compliance with the statute, the invention has been described in language more or less specific as to structural features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A modular exercise, play, and living apparatus for cats, comprising:

a support frame having a base and at least one upstanding frame member which extends upwardly from the base; the support frame including at least one slidably interlocking joint connecting the upstanding frame member and the base to allow interlocking assembly and subsequent disassembly of the support frame, thereby allowing the support frame to be disassembled and arranged in a knocked-down shipping arrangement; said support frame further comprising an elevated platform; and wherein there are a plurality of upstanding frame members extending upwardly from the base; each of said upstanding frame members being connected to the base and to the elevated platform by slidably interlocking joints; the slidably interlocking joints allowing the support frame to be disassembled and arranged in a knocked-down shipping arrangement; and at least one compartment which is supported by the support frame, the compartment having an access opening to allow ingress and egress by a cat.

2. A modular exercise, play, and living apparatus for cats according to claim 1 wherein the slidably interlocking joint includes a receptacle and an inserted part.

3. A modular exercise, play, and living apparatus for cats according to claim 1 wherein the slidably interlocking joint includes:

a receptacle;

an inserted part; and a removable set screw positioned to secure the inserted part within the receptacle.

4. A modular exercise, play, and living apparatus for cats according to claim 1 and further comprising a tube received over the upstanding frame member, the tube having an outer surface which is at least partially covered with a fabric to form a scratching post.

5. A modular exercise, play, and living apparatus for cats according to claim 1 wherein:

the support frame further comprises a plurality of elevated platforms;

there are a plurality of said compartments supported by the support frame, at least one of the compartments being supported on one of the elevated platforms.

6. A modular exercise, play, and living apparatus for cats, comprising:

a support frame having a base and at least one upstanding frame member which extends upwardly from the base; the support frame including at least one slidably interlocking dovetail joint connecting the upstanding frame member and the base to allow interlocking assembly and subsequent disassembly of the support frame, thereby allowing the support frame to be disassembled and arranged in a knocked-down shipping arrangement; and at least one compartment which is supported by the support frame, the compartment having an access opening to allow ingress and egress by a cat.

7. A modular exercise, play, and living apparatus for cats, comprising:

a support frame having:

a base;

at least one elevated platform;

a plurality of upstanding frame members which extend between the base and the at least one elevated platform;

the support frame including a plurality of slidably interlocking dovetail joints connecting the upstanding frame members to the base and to the elevated platform to allow interlocking assembly and subsequent disassembly of the support frame, thereby allowing the support frame to be disassembled and arranged in a knocked-down shipping arrangement; and at least one compartment supported on the elevated platform, the compartment having an entrance to allow ingress and egress by a cat.

8. A modular exercise, play, and living apparatus for cats according to claim 7 wherein there are a plurality of elevated platforms forming the support frame.

9. A modular exercise, play, and living apparatus for cats according to claim 7 wherein the slidably interlocking joints each comprise a receptacle and an inserted part.

10. A modular exercise, play, and living apparatus for cats according to claim 7 wherein the slidably interlocking joints each include:

a receptacle;

an inserted part;

and a removable set screw positioned to secure the inserted part within the receptacle.

11. A modular exercise, play, and living apparatus for cats according to claim 7 wherein there are a plurality of compartments, each compartment being supported by the support frame.

12. A modular exercise, play, and living apparatus according to claim 7 wherein the compartment has a transparent observatory to allow a cat to see out from within the compartment.

13. A modular exercise, play, and living apparatus according to claim 7 and further comprising a tube received over one of the upstanding frame members, the tube having an outer surface which is at least partially covered with a fabric to form a scratching post.

14. A modular exercise, play, and living apparatus according to claim 7 and further comprising a hook extending downward from the elevated platform for connection to a swinging toy.

15. A modular exercise, play, and living apparatus according to claim 7 wherein there are a plurality of compartments, each compartment being in the form of a rectangular box with an entrance aperture.

16. A modular exercise, play, and living apparatus according to claim 7 wherein there are a plurality of compartments, one of the compartments being an eating compartment which is attachable to the support frame on top of the elevated platform to contain a cat's meal and to protect the meal from dogs and children.

17. A modular exercise, play, and living apparatus according to claim 7 wherein there are a plurality of compartments, one of the compartments being a litter compartment for containing cat litter, the litter compartment having an access door for removing cat litter from the litter compartment.

18. A modular exercise, play, and living apparatus according to claim 7 and further comprising an artificial turf mat for placement over the base, the mat having slits so that the mat can be positioned around the upstanding frame members after assembly.

19. A modular exercise, play, and living apparatus for cats, comprising:

a support frame having:

a base;

at least one elevated platform;

a plurality of upstanding frame members which extend between the base and the at least one elevated platform;

the support frame including a plurality of slidably interlocking joints connecting the upstanding frame members to the base and to the elevated platform to allow interlocking assembly and subsequent disassembly of the support frame, thereby allowing the support frame to be disassembled and arranged in a knocked-down shipping arrangement;

wherein the support frame further comprises an intermediate-level shelf supported by the upstanding frame members between the base and the elevated platform; and at least one compartment supported on the elevated platform, the compartment having an entrance to allow ingress and egress by a cat.

20. A modular exercise, play, and living apparatus according to claim 19 further comprising a light extending downward from the shelf, the light having switched operation.

21. A modular exercise, play, and living apparatus according to claim 19 further comprising a swing extending downward from the shelf.

22. A modular exercise, play, and living apparatus according to claim 19 further comprising a rocking toy supported upon the intermediate-level shelf.

23. A modular exercise, play, and living apparatus for cats, comprising:

a support frame having:

a base;

at least one elevated platform;

a plurality of upstanding frame members which extend between the base and the at least one elevated platform;

the support frame including a plurality of slidably interlocking joints connecting the upstanding frame members to the base and to the elevated platform to allow interlocking assembly and subsequent disassembly of the support frame, thereby allowing the support frame to be disassembled and arranged in a knocked-down shipping arrangement;

at least one compartment supported on the elevated platform, the compartment having an entrance to allow ingress and egress by a cat;

at least one slide extending from the compartment to the floor.

24. A modular exercise, play, and living apparatus according to claim 23 wherein said at least one slide is a tubular slide extending from the compartment to the floor in a spiral path, the slide having an intermediate position along its length;

and further comprising a support strut positioned beneath the intermediate position along the length of the slide.

25. A modular exercise, play, and living apparatus according to claim 23 wherein said at least one slide is a tubular slide extending from the compartment to the floor in a spiral path, the slide having a top surface along its length;

and further comprising a strip of carpet along the top surface of the tubular slide.

26. A modular exercise, play, and living apparatus according to claim 23 wherein said at least one slide is a tubular slide extending from the compartment to the floor in a spiral path, the slide including a lower portion;

and further comprising a hinged joint in the tubular slide, the hinged joint allowing the lower portion of the slide to be pivoted away from the apparatus.

27. A modular exercise, play, and living apparatus according to claim 23 wherein said at least one slide is a tubular slide extending from the compartment to the floor, and wherein the slide comprises a plurality of pieces which are capable of assembly to extend around the support frame to the floor.

28. An exercise, play, and living apparatus for cats, comprising:

a support frame having a base and at least one elevated platform;

a living compartment supported on the elevated platform, said living compartment having an entrance to allow a cat to enter the living compartment from the elevated platform;

an eating compartment supported on the elevated platform to contain a cat's meal and to protect the meal from dogs and children;

a litter compartment supported on the base for containing cat litter, the litter compartment having an access door for removing cat litter from the litter compartment;

a slide extending from the living compartment to the floor.

29. An exercise, play, and living apparatus according to claim 28 and further comprising a tubular slide extending from the living compartment to the floor, wherein the slide comprises a plurality of pieces which are assembleable to extend around the support frame to the floor.

30. An exercise, play, and living apparatus according to claim 28 wherein the support frame further comprises an intermediate-level shelf between the base and the elevated platform.

* * * * *